US006658737B2

(12) United States Patent
Shigemura

(10) Patent No.: US 6,658,737 B2
(45) Date of Patent: Dec. 9, 2003

(54) INK JET RECORDING HEAD AND MANUFACTURING METHOD THEREOF

(75) Inventor: Koji Shigemura, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 147 days.

(21) Appl. No.: 09/843,626

(22) Filed: Apr. 26, 2001

(65) Prior Publication Data

US 2001/0030673 A1 Oct. 18, 2001

Related U.S. Application Data

(62) Division of application No. 09/272,307, filed on Mar. 19, 1999, now Pat. No. 6,361,151.

(30) Foreign Application Priority Data

Mar. 20, 1998 (JP) ............................................ 10-90670

(51) Int. Cl.[7] ................................................ B23P 17/00
(52) U.S. Cl. ........................... 29/890.1; 29/846; 29/831
(58) Field of Search ............................ 29/25.35, 890.1, 29/846, 831; 347/69, 71, 68, 94

(56) References Cited

U.S. PATENT DOCUMENTS

| | | | | |
|---|---|---|---|---|
| 5,535,494 A | * | 7/1996 | Plesinger | 29/25.35 |
| 5,650,810 A | * | 7/1997 | Muto | 347/71 |
| 5,680,163 A | * | 10/1997 | Sughara | 347/71 |
| 5,801,731 A | * | 9/1998 | Takahashi | 347/69 |

FOREIGN PATENT DOCUMENTS

| | | |
|---|---|---|
| EP | 0 600 748 | 6/1994 |
| EP | 0 653 303 | 5/1995 |
| EP | 0 857 572 | 8/1998 |
| GB | 2 265 113 | 9/1993 |
| JP | 53-12138 | 4/1978 |
| JP | 61-59913 | 12/1986 |
| JP | 4-348949 | 12/1992 |
| JP | 6-143564 | 5/1994 |
| JP | 6-171096 | 6/1994 |
| JP | 7-178903 | 7/1995 |
| JP | 9-39233 | 2/1997 |
| JP | 09039233 A * | 2/1997 |

* cited by examiner

*Primary Examiner*—Carl J. Arbes
*Assistant Examiner*—Tai Nguyen
(74) *Attorney, Agent, or Firm*—Young & Thompson

(57) ABSTRACT

An ink jet recording head and a manufacturing method thereof enables no ink electrolysis to be generated, such occurrence of the ink electrolysis is caused by construction or mechanism of respective ink jet recording head using piezoelectric body. Ink channel and dummy channel are formed alternately at the both sides of a side wall of piezoelectric body respectively. There is discharged ink drop while changing volume within the ink channel by applying electric field using electrode formed within respective channels. An electrode formed on respective ink channels is taken as common electrode, while electrodes formed on respective dummy channel are taken as individual electrodes, thus causing no ink to be contacted with a passivation film formed on the individual electrodes.

8 Claims, 16 Drawing Sheets

INK JET RECORDING HEAD AND MANUFACTURING METHOD THEREOF

This is a Divisional Application of application Ser. No. 09/272,307, filed Mar. 19, 1999 now U.S. Pat. No. 6,361, 151.

BACKGROUND OF THE INVENTION

The present invention relates to an ink jet recording head and a manufacturing method thereof. More particularly, this invention relates to an ink jet recording head and a manufacturing method thereof, in which it is capable of being arranged multi-nozzle and high density nozzle, being in use for a printer, facsimile, or copying machine.

Description of the Prior Art

Formerly, this kind of the ink jet recording device is capable of being divided into largely two classes in terms of point of ink discharge drive source.

One is a method so called as thermal ink jet or bubble jet, for instance, being disclosed in the Japanese Patent Publication No. SHO 61-59913. This method is a method in which pressure chambers are formed in answer to respective thermal elements on a thermal head to which a plurality of thermal elements are arranged, and a nozzle and an ink supply path open to the pressure chamber, at the time of printing, causing the thermal element to be energized to heat an ink to be generated bubble, so that it causes the ink to be discharged from the nozzle by virtue of the pressure of the bubble.

With respect to this type, a thermal head which is a discharge source is capable of being manufactured by photolithography technology so that there can be formed printing head with high density and multi-nozzle, thus enabling small-sized and high-speed ink jet recording device to be obtained. However, it is necessary to heat ink more than 300° C. in order to generate bubble. For that reason, when discharge is implemented for a long time, ingredients within ink are accumulated on the thermal element to cause inferior discharge, further, there occurs damage caused by thermal stress or cavitation, and passivation trouble caused by pinhole of a protective layer of the thermal element, thus it is difficult to obtain long life printing head.

The other one is a method so called as a piezoelectric method, for instance, being disclosed in the Japanese Patent Publication No. SHO 53-12138. The piezoelectric method consists of a pressure chamber together opening into both of a nozzle and an ink supply path, and a piezoelectric element generating volume change to the pressure chamber. At the time of printing, there is applied voltage to the piezoelectric element in order to generate the volume change to the pressure chamber to be discharged ink from the nozzle.

With respect to the piezoelectric method, since the ink is not heated, the degree of freedom of ink selection is high, and to be long life, however, it is difficult to arrange many piezoelectric elements in high density, it is difficult to obtain small-sized and high speed ink jet recording device.

For that reason, in order to achieve such problems there is disclosed the matter shown in FIG. 1 in terms of the Japanese Patent Application Laid-Open No. RET 6-143564. There is alternately formed ink channels 41*bc*, 41*de*, . . . , and dummy channels 42*ab*, 42*ad*, . . . , whose upper side covered with a top plate 44, and whose sides thereof surrounded by partition walls 43*b*, 43*a*, 43*d*, 43*e*, . . . , on a substrate 40 made of the piezoelectric element formed into one piece of plate made of piezoelectric material. The ink is filled into only 41*bc*, 41*de*, . . . .

Furthermore, the partitions 43*b*, 43*a*, 43*d*, 43*e*, . . . polarize the partitions 43*b*, 43*a*, 43*d*, 43*e*, . . . as an arrow (polarization direction 47) using electrodes 48*ab*, 48*ba*, 48*cd*, 48*de*, . . . formed in the channel. In this case, with respect to the direction of the polarization, which is directed to opposite direction with each other at the adjacent partitions therebetween. When there is fixed the dummy channel out of the dummy channels 42*ab*, 42*cd*, . . . into common ground electric potential, and there is applied drive electric pulse to the ink channel, the partition elongates in the direction of the electric field so that it causes volume within the ink channel to be changed to enable ink discharge to be implemented.

In the above-described conventional ink jet recording head, when there is a defect in the protective layer protecting electrode or there is an electrical withstand voltage failure with no defect, there is a problem that an electric field generated between individual electrode-common electrode interacts the ink. The ink used generally, has certain electric conductivity, when the electric field interacts with the ink, there occurs electrolysis so that hydrogen is generated from cathode and oxygen is generated from anode. Generation situation of the hydrogen and the oxygen depends on ink electric conductivity, protective layer electrical characteristic, and oxidation and reduction electric potential of electrode material, in all cases, gasses occurrence become bubble within the ink channel to cause ink discharge failure. The gasses occurrence produces electrolysis so that physical property value of the ink changes greatly. This matter influences ink discharge characteristic with large effect.

Moreover, when electrolysis reaction progress in greatly, viscosity of the ink increases greatly, there may occur blocking fluidity of the ink within the ink channel.

SUMMARY OF THE INVENTION

In view of the foregoing, it is an object of the present invention, in order to achieve the above mentioned problems, there is provided an ink jet recording head and a manufacturing method thereof in which there is prevented occurrence of ink electrolysis caused by individual configuration of ink jet recording head using piezoelectric body and mechanism.

According to a first aspect of the present invention, in order to achieve the above-mentioned object, there is provided an ink jet recording head in which an ink channel and a dummy channel are formed alternately in such a way that a side wall of a piezoelectric body intervenes between the ink channel and the dummy channel, thus there is discharged an ink drop while changing volume within the ink channel by applying an electric field to a channel using an electrode formed within respective channels, wherein an electrode formed on respective the ink channels is taken as a common electrode, while an electrode formed on respective the dummy channels is taken as an individual electrode, causing no ink to be contacted with a passivation film formed on the individual electrode.

According to a second aspect of the present invention there is provided an ink jet recording head which comprises a plate consisting of a piezoelectric body, a groove formed on the plate, a channel in which there exists an electrode on the inside of the groove, and whose both sides are partitioned by a side wall of the piezoelectric body, and whose upper side is covered by a top plate, a nozzle opening into the channel; and a control system including a voltage apply means for applying an electric field to the electrode, in which the side wall intervenes adjacent ink channels therebetween so as to be held in common by the adjacent ink channels, there is taken alternate channel filled with an ink as an ink channel and another channel as dummy channel, thus causing ink drop to be discharged from the nozzle while deforming the wall of both sides constituting the ink channel, wherein there is taken an electrode formed on the ink channel as a common electrode, while it causes no ink to be contacted with a passivation film on an individual electrode formed on the dummy channel.

According to a third aspect of the present invention, there is provided a manufacturing method of the ink jet recording head which comprises the steps of forming a groove for functioning as an ink channel and a dummy channel on a piezoelectric body, forming an electrode layer on the inside of the groove, forming a passivation film on said electrode layer, uniting a nozzle plate and a top plate after forming the passivation film, and forming a slit at the top plate, wherein when there is formed the slit at the top plate, there is formed individual electrode by separating the electrode layer while implementing groove formation to the bottom surface of the dummy channel.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will be described in detail in accordance with the accompanying drawings.

Figure 1:
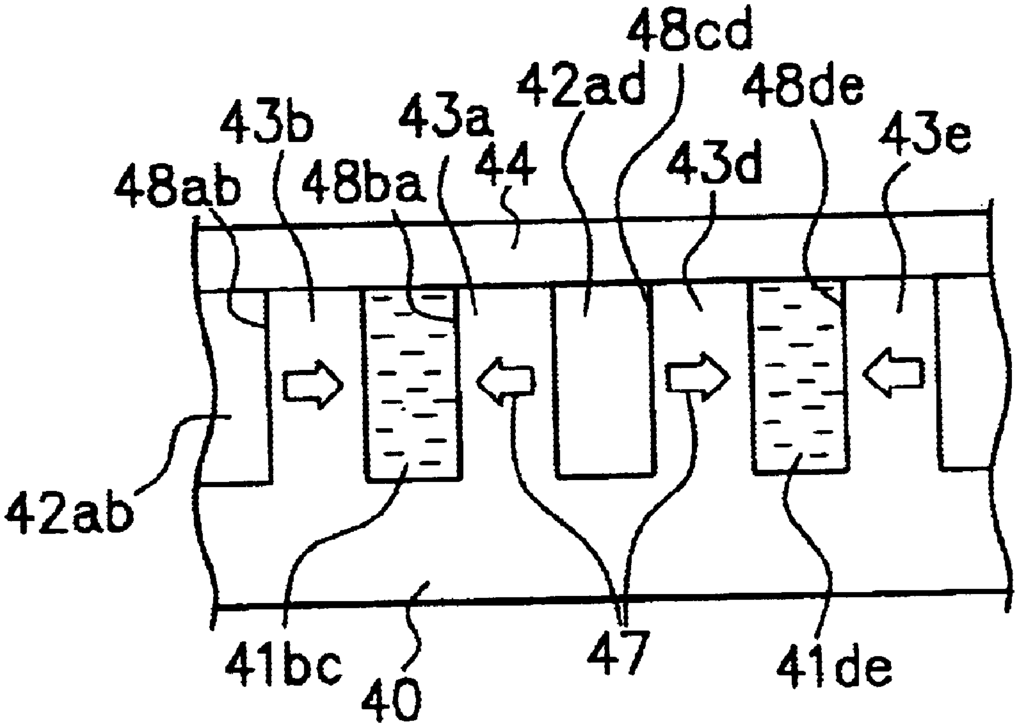
FIG. 1 PRIOR ART
FIG. 1 is an explanation view showing a conventional example.
Figure 2:
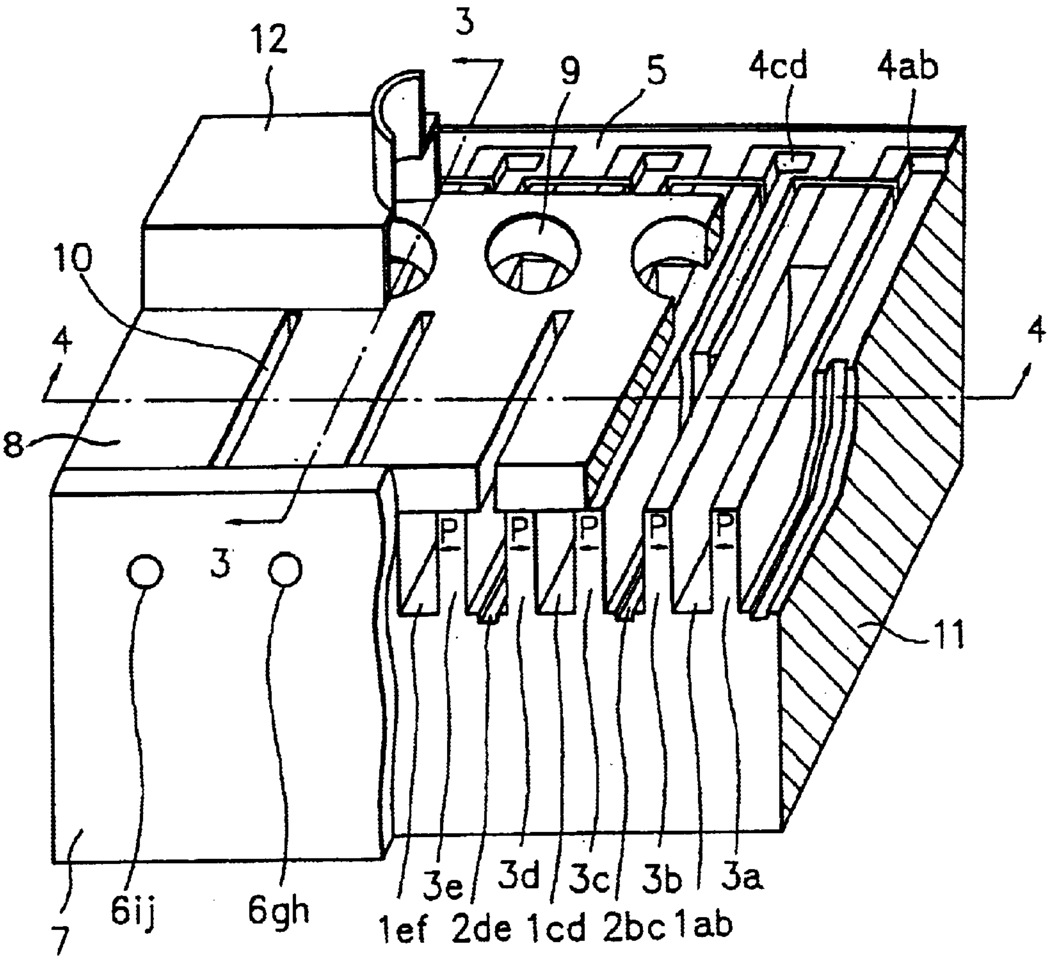
FIG. 2 is a perspective view, partly in section showing ink jet recording head according to an embodiment of the present invention.
Figure 3:
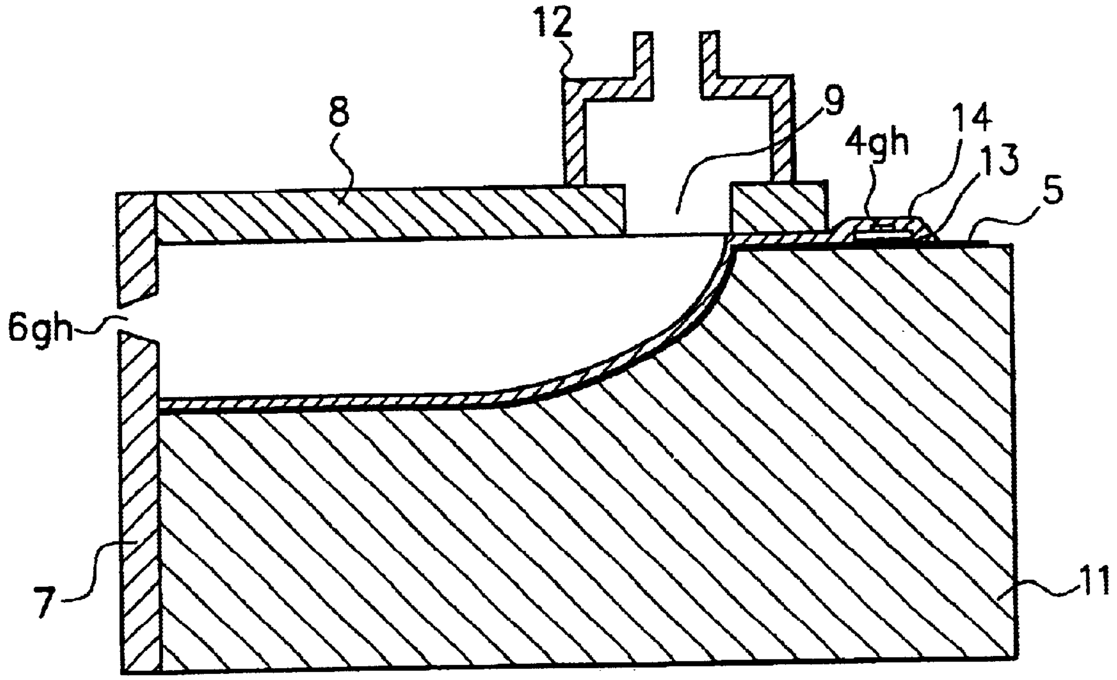
FIG. 3 is a sectional view along line 3—3 of FIG. 2.
Figure 4:
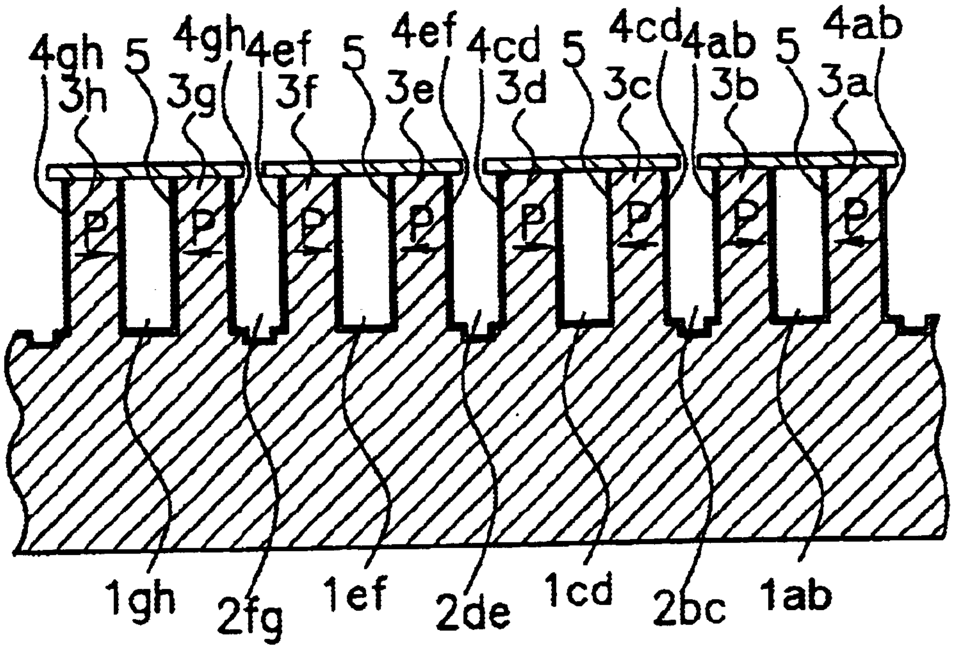
FIG. 4 is a sectional view along line 4—4 of FIG. 2.

FIG. 2 is a perspective view, partly in section showing ink jet recording head according to an embodiment of the present invention. FIG. 3 is a sectional view along line 3—3 of FIG. 2.

In these drawings, ink channels 1*ab*, 1*cd*, 1*ef*, . . . and dummy channels 2*bc*, 2*de*, . . . are surrounded by side walls 3*a*, 3*b*, 3*c*, 3*d*, 3*e*, . . . consisting of a piezoelectric body 11 in terms of both sides and lower side, and surrounded by a top plate 8 and a nozzle plate in terms of respective upper side and front side. There is provided an ink pool 12 opening into the ink channels 1*ab*, 1*cd*, . . . through an ink supply opening 9 at the rear side of the ink channels 1*ab*, 1*cd*, . . . There are provided nozzles 6*ab*, 6*cd*, 6*ef*, 6*gh*, 6*ij*, . . . , (not illustrated 6*ab*, 6*cd*, and 6*ef*) opening into respective ink channels 1*ab*, 1*cd*, . . . , at the nozzle plate 7. There are provided a common electrode 5 within the ink channels 1*ab*, 1*cd*, . . . , and individual electrodes 4*ab*, 4*cd*, within dummy channels 2*bc*, 2*de*, . . . at the respective sides and lower side of side walls 3*a*, 3*b*, 3*c*, 3*d*, 3*e*, . . . , consisting of the piezoelectric body 11.

Here, the individual electrode of 4*cd*, by way of example, is provided so as to connect the side of the side wall 3*c* of the dummy channel 2*bc*with the side of the side wall 3*d* of the dummy channel 2*de*. There are provided interlayer isolation film 13 at the region where the individual electrodes 4*ab*, 4*cd*, . . . and the common electrode 5 cross, and a passivation film 14 at the portion where is exposed in the channel of the common electrode 5, respectively.

The ink (not illustrated) is filled with the ink channels 1*ab*, 1*cd*, . . . , the nozzles 6*ab*, 6*cd*, . . . , and the ink pool 12. The side walls 3*a*, 3*b*, 3*c*, 3*d*, 3*e*, . . . , consisting of the piezoelectric body 11 are given polarization processing in the width direction (in the arrow P direction) thereof. Further, the top plate 8 has flexibility and there are provided slits 10 separated on the dummy channels 2*bc*, 2*de*, . . . .

Further, the length of the ink channels 1*ab*, 1*cd*, . . . , is longer than the length of the dummy channels 2*bc*, 2*de*, . . . . The reason why there is intended that it causes the ink to be filled with only ink channel because the slits 10 are provided with the top plate 8 on the dummy channels 2*bc*, 2*de*, . . . . There is supplied the ink filled within the ink pool to the ink channel from the ink supply opening 9.

FIG. 3 is a sectional view along line 3—3 of FIG. 2. In FIG. 3, there are provided the interlayer isolation film 13 between the common electrode 5 and the individual electrodes 4*ab*, 4*cd*, . . . , and the passivation film 14 at the whole region without the pad section. The ink does not contact with these electrodes directly by virtue of the passivation film 14.

Next, operation will be described.

FIGS. 4 to 7 are explanation views of operation corresponding to the sectional view along line 4—4 of the ink jet recording head shown in FIG. 2. Referring to FIGS. 4 to 7, there will be described the case where it causes certain specified ink channel 1*cd* to be driven out of a plurality of ink channels 1*ab*, 1*cd*, . . . , thus discharging ink drop from the nozzle 6*cd* (not illustrated) opening into the ink channel 1*cd*.

Figure 5:
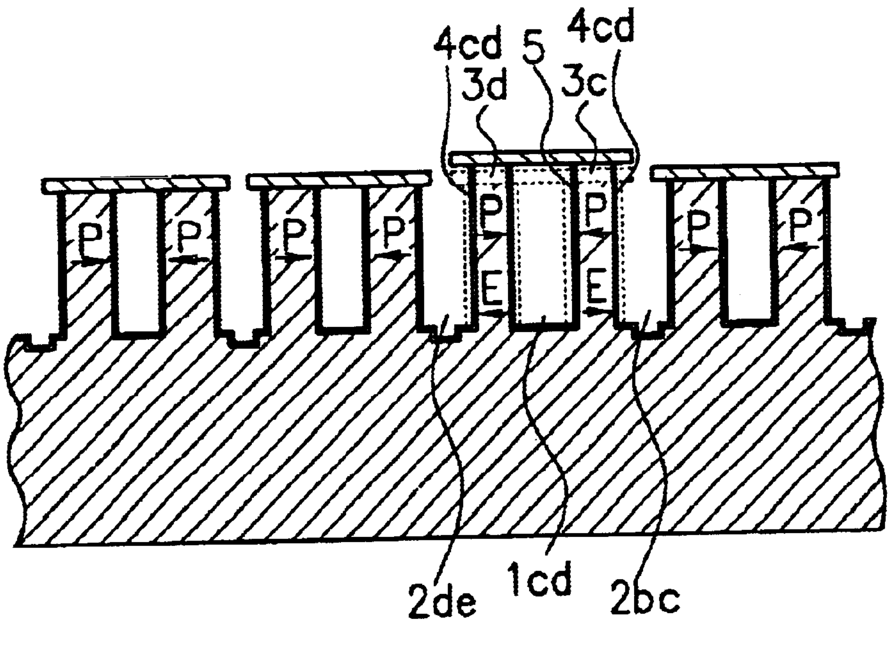
FIG. 5 is a sectional view explaining operation of the ink jet recording head according to the embodiment of the present invention.

Here, the drive of the ink channel means that it causes the side walls 3*c*, and 3*d* to be driven, the side walls 3*c*, and 3*d* comprising the piezoelectric body 11 of the both sides which constitute the ink channel. As shown in FIG. 5, when it causes the electric field to be generated in the arrow E direction while applying voltage toward the side walls 3*c*, and 3*d* of the piezoelectric body 11 surrounding the ink channel 1*cd* discharging ink drop, the side walls 3*c*, and 3*d* shrink in the electric field direction, while expand in the vertical direction to the electric field direction, because the polarization direction (the arrow P direction) is reverse direction of the electric field direction (the arrow E direction.

As a result, the ink is supplied to the ink channel 1*cd* from the ink pool only corresponding quantity of volume increase, because volume of the ink channel increases so that pressure decreases.

Figure 6:
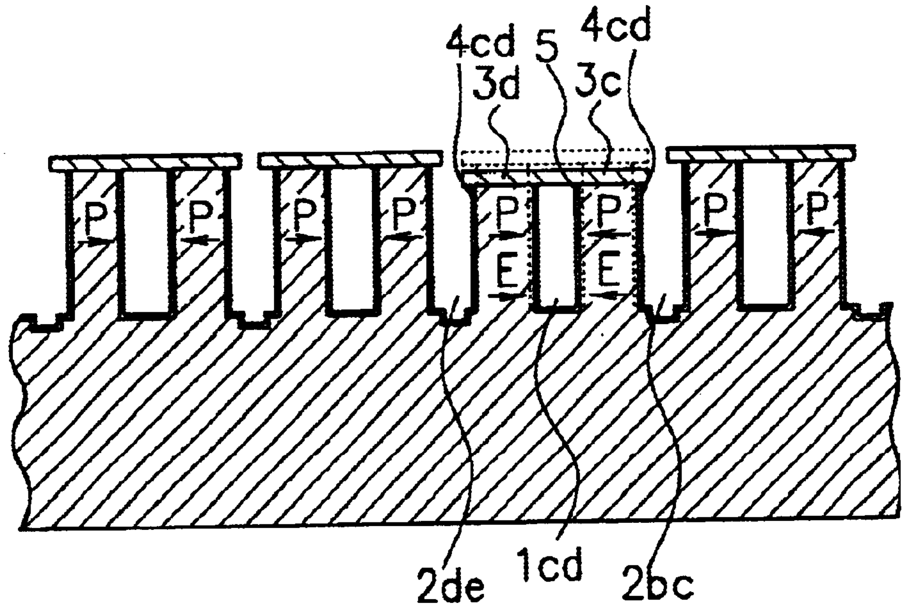
FIG. 6 is a sectional view explaining operation of the ink jet recording head according to the embodiment of the present invention, same as FIG. 5.

Next, as shown in FIG. 6, when it causes the electric field to be generated in the arrow E direction while applying voltage toward the side walls 3*c*, and 3*d* of the piezoelectric body 11 surrounding the ink channel 1*cd* discharging ink drop, the side walls 3*c*, and 3*d* expand in the electric field direction, while shrink in the vertical direction to the electric field direction, because the polarization direction (the arrow P direction) is the same direction as the electric field direction (the arrow E direction).

As a result, the ink drop is discharged from the nozzle 6*cd*, because volume of the ink channel decreases so that pressure increases. Here, there is a matter to be taken notice. It enables the ink drop to be discharged while changing the state of FIG. 4 into the state of FIG. 6 directly by pressure increase of the ink channel. It is capable of controlling position of meniscus by entering the state of FIG. 5 in between.

Figure 7:
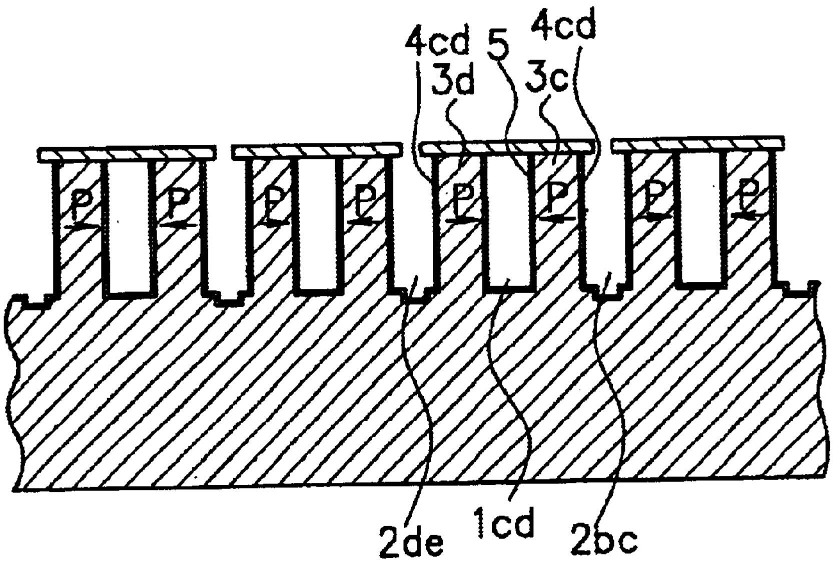
FIG. 7 is a sectional view explaining operation of the ink jet recording head according to the embodiment of the present invention, same as FIG. 5.

Next, when impressed voltage to the side walls 3*c*, and 3*d* namely the electric field is made zero "0", as shown in FIG. 7, the side walls 3*c*, 3*d* return to former state, then the ink is supplied to the ink channel 1*cd* from the ink pool by only corresponding quantity of volume increase, because the volume of the ink channel 1*cd* increases so that the pressure decreases.

For that reason, the ink supply to the ink channel is implemented with the two states of FIGS. 5 and 7. There is stabilized the speed of the ink drop and frequency characteristics of drop diameter so that it is capable of being implemented suitable discharge of the ink drop.

Further, during the above operation, the ink channel is always of the grounded, and the ink does not contact completely with the passivation film 14 on the individual electrodes 4*ab*, 4*cd*,. . . . Consequently, the electric field does not affect the ink at the time of drive, thus there does not occur the electrolysis of the ink completely, which occurs generally caused by the defect of the passivation film 14, or caused by the electronic withstand voltage failure without defect.

Next, there will be described manufacturing method of the ink jet recording head shown in FIG. 2 referring to the accompanying drawings. FIGS. 8 to 15 are perspective views showing the ink jet recording head in every manufacturing process. There is roughly classified into 6 processes of a channel formation, an electrode formation, a protective layer formation, a slit formation, and a gluing process.

Figure 8:
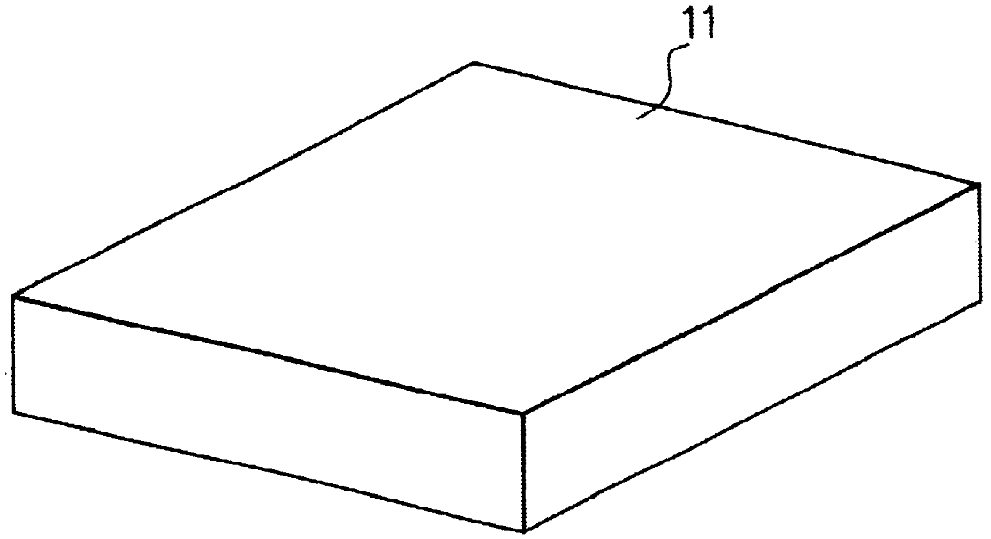
FIG. 8 is a perspective view showing manufacturing method of the ink jet recording head in process order according to the embodiment of the present invention.
Figure 9:
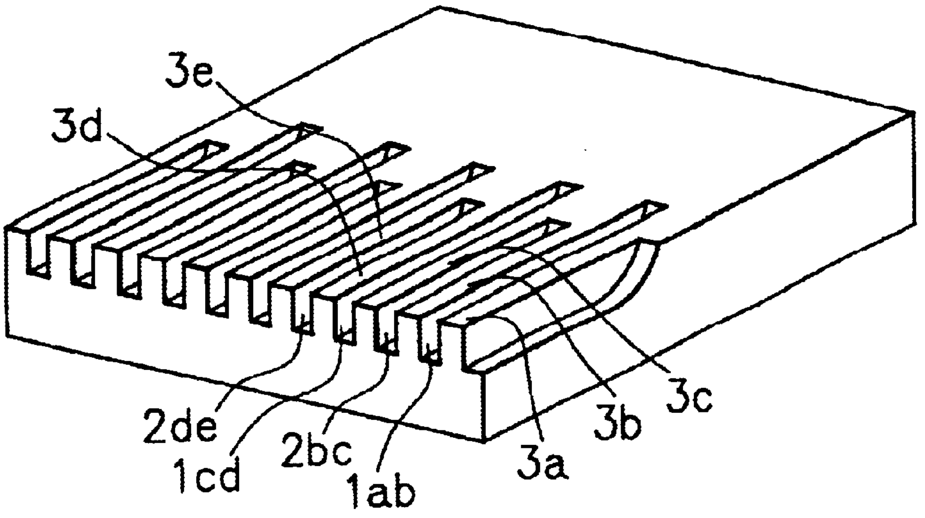
FIG. 9 is a perspective view showing manufacturing method of the ink jet recording head in process order according to the embodiment of the present invention.

Referring to FIG. 5, in the channel formation process, firstly, as shown in FIG. 8, there is implemented channel formation such that there are alternately arranged grooves functioning by way of the ink channels 1*ab*, 1*cd*, . . . , and grooves functioning by way of the dummy channels 2*bc*, 2*de*, . . . , toward the piezoelectric body 11 consisting of 3-component system soft ceramics that perovskite system complex oxide is added to PZT, by machining of the dicing saw shown in FIG. 9.

At this time, length of the ink channels 1*ab*, 1*cd*, . . . , are larger than the dummy channels 2*bc*, 2*de*, . . . , and end section of the ink pool side of the groove has a curvature.

Figure 10:
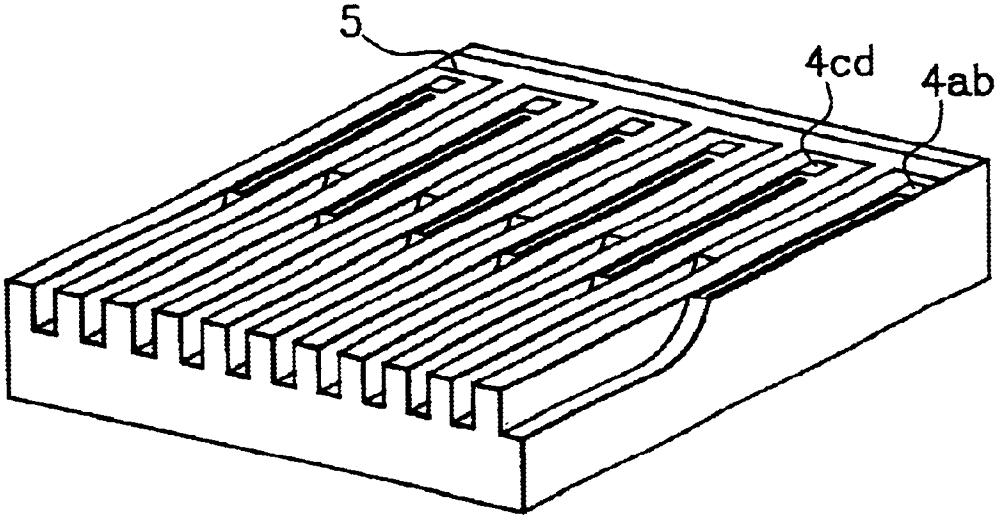
FIG. 10 is a perspective view showing manufacturing method of the ink jet recording head in process order according to the embodiment of the present invention.

Next, the electrode formation consists of three processes. A first process is that film of aluminum is formed by sputtering by way of electrode layer so as to cover whole groove, thus forming the common electrode 5 and parts of individual electrodes 4*ab*, 4*cd*, . . . , using photolithography technology as shown in FIG. 10.

Here, parts of individual electrodes 4*ab*, 4*cd*, . . . , are region with the exception of parts of the common electrode 5 crossing. By way of the electrode layer, which is capable of being formed of aluminum alloy such as aluminum-copper, aluminum-silicon, aluminum-silicon-copper by sputtering or vapor deposition.

Figure 11:
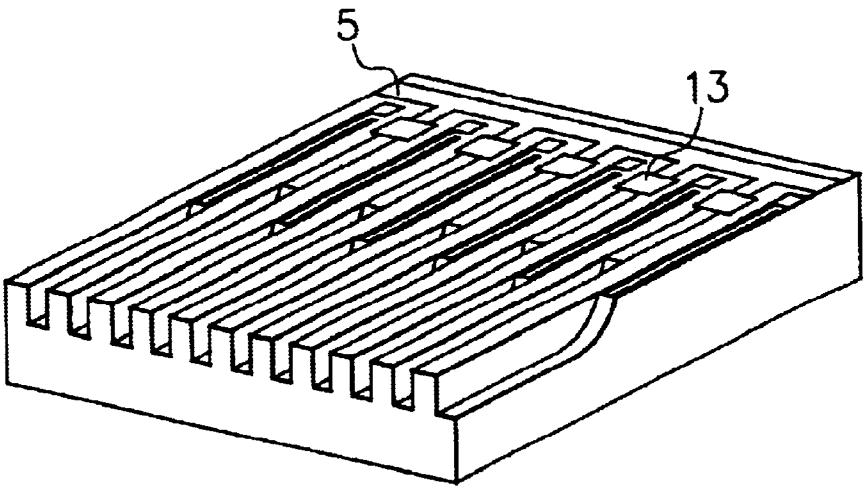
FIG. 11 is a perspective view showing manufacturing method of the ink jet recording head in process order according to the embodiment of the present invention.

A second process is to form the interlayer isolation film 13 on the common electrode 5 at the region shown in FIG. 11. At this time, the groove section undergoes masking, thus there is formed the isolation film only at the plane section. The required pattern is obtained using photolithography technology thereafter.

By way of the interlayer isolation film 13, which is capable of being formed such that silicon dioxide, silicon nitride, BPSG film, macromolecule material undergo CVD, sputtering and so forth. The patterning of the interlayer isolation film is to use dry etching.

Figure 12:
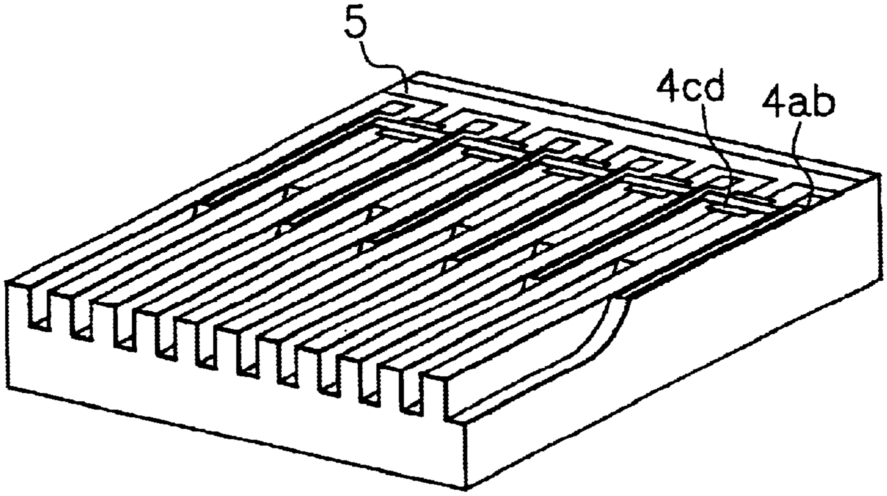
FIG. 12 is a perspective view showing manufacturing method of the ink jet recording head in process order according to the embodiment of the present invention.
Figure 13:
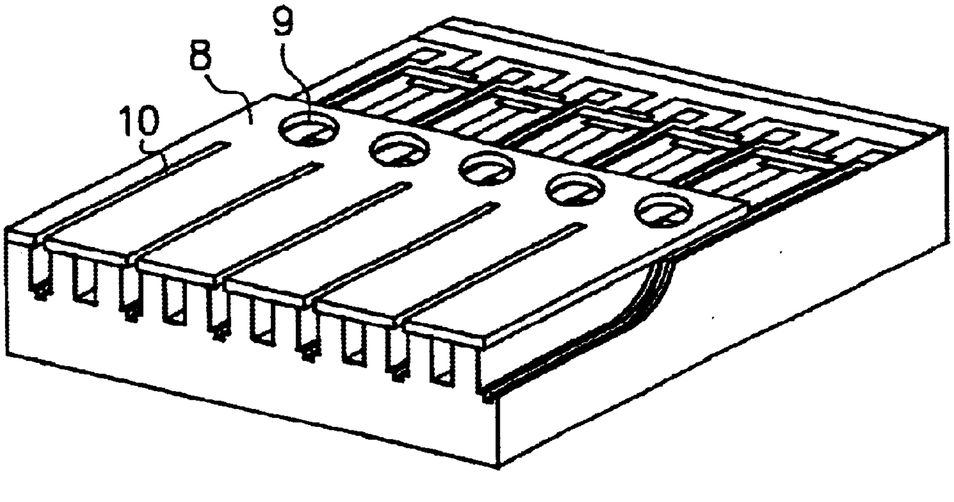
FIG. 13 is a perspective view showing manufacturing method of the ink jet recording head in process order according to the embodiment of the present invention.

A third process is to form remaining section of the individual electrodes 4*ab*, 4*cd*, . . . , as shown in FIG. 12. Here, the remaining section means that the section to which the common electrode 5 crosses, which is not formed in FIG. 10. At this case, the groove section undergoes the masking, there is formed the film of electrode layer at the plane section. The required pattern is obtained using photolithography technology thereafter.

At this time, the individual electrodes 4*ab*, 4*cd*, . . . , are connected with each other within the dummy channels 2*bc*, 2*de*, . . . , thus being formed incompletely. This formation will be described at FIG. 13.

Next, the passivation film 14 by way of the protective layer formation to form to whole surface (including groove) with the exception of pad section. It is desirable to form the passivation film 14 such that silicon dioxide or BPSB film with suitable wetting property undergoes the CVD with suitable step coverage because the passivation film 14 touches the ink directly.

Next, the gluing process is to glue the top plate 8 of polyimide in which the ink supply opening 9 is formed beforehand such that the top plate 8 covers the dummy channels 2*bc*, 2*de*, . . . , completely, and opening into the ink channels 1*ab*, 1*cd*, . . . , and the ink supply opening 9. It permits the top plate 8 to be isolated on the dummy channels 2*bc*, 2*de*, . . . , and the slit 10 to be formed deeply more than bottom section by means of the dicing saw. This state will be shown in FIG. 13.

Here, the slit is to form at the bottom section of the dummy channels 2*bc*, 2*de*, . . . , in order to isolate the individual electrodes completely. At this time point, there is formed the individual electrodes functioning completely. Here, there can be used material with high rigidity such as ceramics, glass, silicon, and so forth instead of polyimide in which there is applied thermoplastic adhesive or thermosetting adhesive on one side by way of the top plate.

Figure 14:
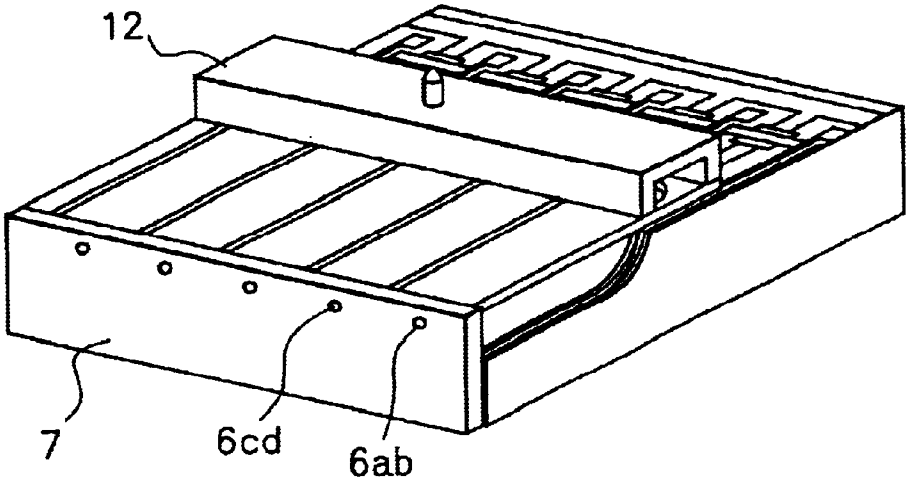
FIG. 14 is a perspective view showing manufacturing method of the ink jet recording head in process order according to the embodiment of the present invention.

As shown in FIG. 14, there is glued the nozzle plate 7 at end surface of the ink channels 1*ab*, 1*cd*, . . . , such that there opens the plurality of nozzles 6*ab*, 6*cd*, . . . , formed through excimer laser processing on the nozzle plate 7 of polyimide into the ink channels 1*ab*, 1*cd*, . . . , thereafter.

There is glued the ink pool 12 of PS (polysulfone) to the ink supply opening 9 using silicon system adhesive sheet so as to cover the ink supplying opening 9 thereafter. Here, there can be used thin plate such as nickel, and stainless steel, instead of polyimide in which there is applied thermoplastic adhesive or thermosetting adhesive on one side by way of the nozzle plate 7.

Figure 15:
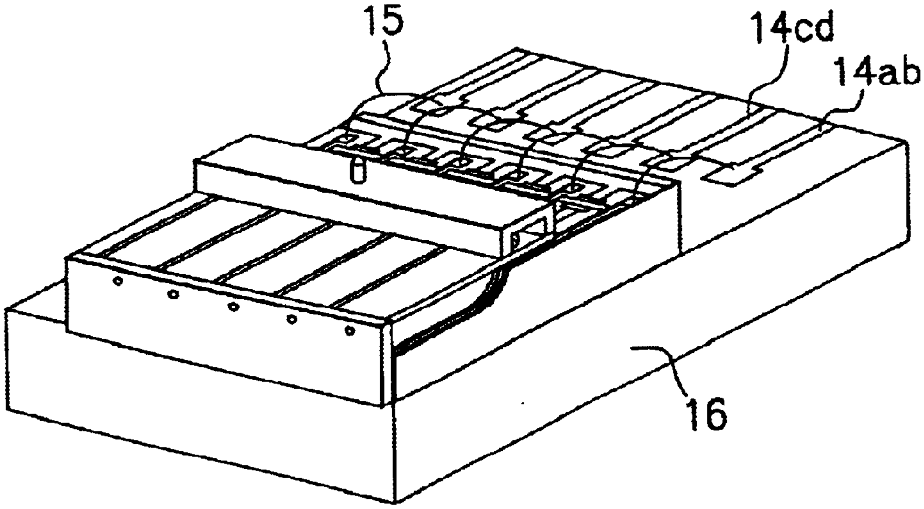
FIG. 15 is a perspective view showing manufacturing method of the ink jet recording head in process order according to the embodiment of the present invention.

Next, as shown in FIG. 15, there is united a print substrate 16 to the bottom surface of the piezoelectric body 11. In the print circuit board, there are formed lead terminal sections 14*ab*, 14*cd*, . . . , for connecting electrically to the pad section, thus being connected electrically to a drive circuit (not illustrated). The pad section is connected to the lead terminal sections 14*ab*, 14*cd*, . . . , by wire bonding 15. There is used gold by way of material of the bonding wire 15.

Figure 16:
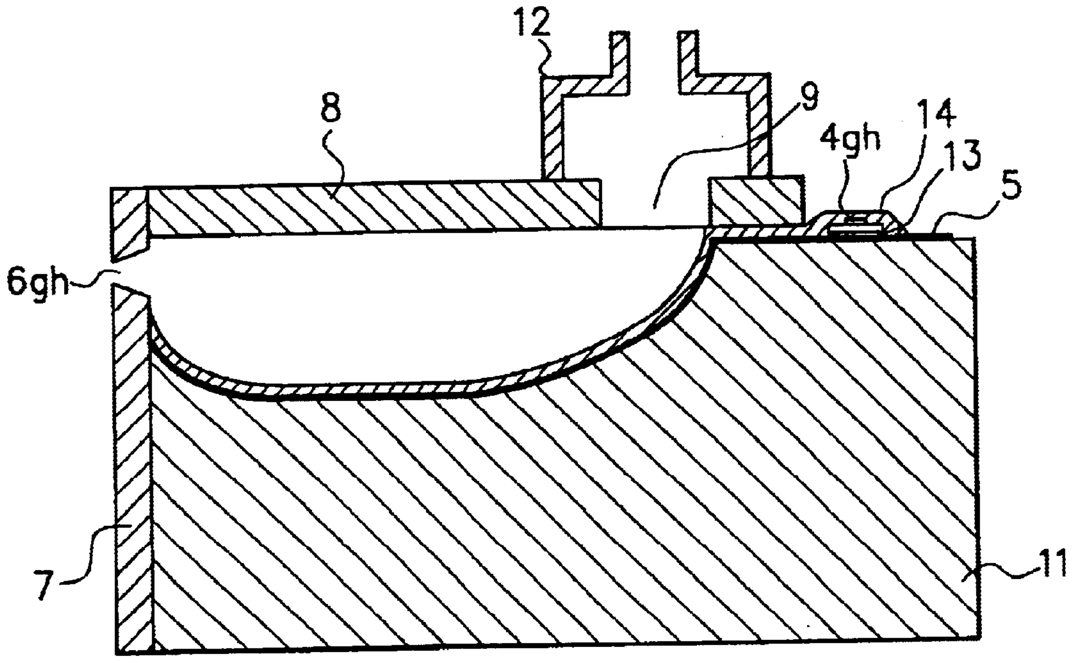
FIG. 16 is a sectional view showing the ink jet recording head according to the embodiment of the present invention.

Furthermore, in the above-described embodiment, as shown in FIG. 16, it is suitable that shape of end section of nozzle side of the ink channel has a curvature. The curvature contributes to stabilization of discharge of the ink drop in that air penetrating within the ink channel becomes difficult to be trapped, thus being improved air discharge property and flow of the ink becomes smooth.

The ink jet recording head of the present invention causes the electrode to function as the common electrode, formed in the ink channel, and having a constitution causes no ink to be contacted with the passivation film on the individual electrode formed on the dummy channel, therefore, at the time of the driving, the electric field does not affect to the ink, there does not occur the electrolysis of the ink completely, which generally occurs caused by defect of the passivation film 14, or caused by electric withstanding voltage failure without the defect. This is to contribute to long life of the head, and to high print quality because there does not occur change of physical property of the ink during driving perfectly.

Furthermore, according to the manufacturing method of the ink jet recording head of the present invention, it enables electrode separation within the dummy channel to be implemented at the same time of the slit formation, thus it is capable of being manufactured the ink jet recording head in stable state, in low cost, and accurately. There is the effect that since both ends of the ink channel are formed with the curvature, the air discharging property is excellent, thus contributing to stabilization of ink drop discharging.

As described above, according to the ink jet recording head of the present invention, there is taken the electrode formed on the ink channel as the common electrode, and causing no ink to be contacted with the passivation film on the individual electrode formed at the dummy channel, for that reason, it is capable of being prevented occurrence of the electrolysis of the ink, thus there is the effect that it becomes possible to implement long life print, and high quality print.

Furthermore, according to the manufacturing method of the ink jet recording head of the present invention, since there are implemented both of the individual electrodes formation and the slit formation in the same manufacturing process, there is the effect that it is capable of manufactured in low cost, and in the stable state.

Moreover, since there is formed the channel into the shape in which both end of the ink channel have the curvature, there is the effect that the air discharging property is excellent, and contributing to stabilization of the ink drop discharging.

While preferred embodiments of the invention have been described using specific terms, such description is for illustrative purpose only, and it is to be understood that changes and variations may be made without departing from the spirit or scope of the following claims.

What is claimed is:

1. A manufacturing method of an ink jet recording head comprising the sequential steps of:

forming a groove for functioning as an ink channel and a dummy channel on a piezoelectric body;

forming an electrode layer on an inside of said groove;

forming a passivation film on said electrode layer;

uniting a nozzle plate and a top plate after forming said passivation film; and forming a slit at said top plate, wherein when there is formed said slit at said top plate, there is formed an individual electrode by separating said electrode layer while forming a groove in a bottom surface of said dummy channel.

2. A manufacturing method of an ink jet recording head as claimed in claim 1, wherein there is used dicing saw for forming of said slit.

3. A manufacturing method of an ink jet recording comprising the sequential steps of:

forming a plurality of first grooves on a piezoelectric body for functioning as an ink channel;

forming a plurality of second grooves on said piezoelectric body for functioning as a dummy channel;

forming an electrode layer on an inside of said plural first grooves;

forming an electrode on an inside of each of said plural second grooves;

forming a passivation film on said electrode layer;

uniting a top plate and said piezoelectric body; and forming a slit in said top plate, so that when said slit is formed an individual electrode is formed by separating said electrode layer and another groove is formed in a bottom surface said dummy channel.

4. The manufacturing method of an ink jet recording head as claimed in claim 3, further comprising the steps of:

forming an interlayer isolation film on said electrode layer; and electrical connecting each electrode of said plural second grooves.

5. The manufacturing method of an ink jet recording head as claimed in claim 3, wherein said electrode layer and said electrode are formed by sputtering.

6. The manufacturing method of an ink jet recording head claimed in claim 3, further comprising a step of uniting a nozzle plate to said piezoelectric body.

7. The manufacturing method of an ink jet recording head as claimed in claim 6, wherein said nozzle plate and said top plate are united by gluing.

8. A manufacturing method of an ink jet recording head comprising the steps of:

forming a first groove on a piezoelectric body for functioning as an ink channel;

then forming a second groove on said piezoelectric body for functioning as a dummy channel;

then forming an electrode layer on an inside of said first and second grooves;

forming a passivation film on said electrode layer;

uniting a top plate and said piezoelectric body; and forming a slit in said top plate, so that when said slit is formed an individual electrode is formed by separating said electrode layer and another groove is formed in a bottom surface of said dummy channel.

* * * * *